Figure 1:
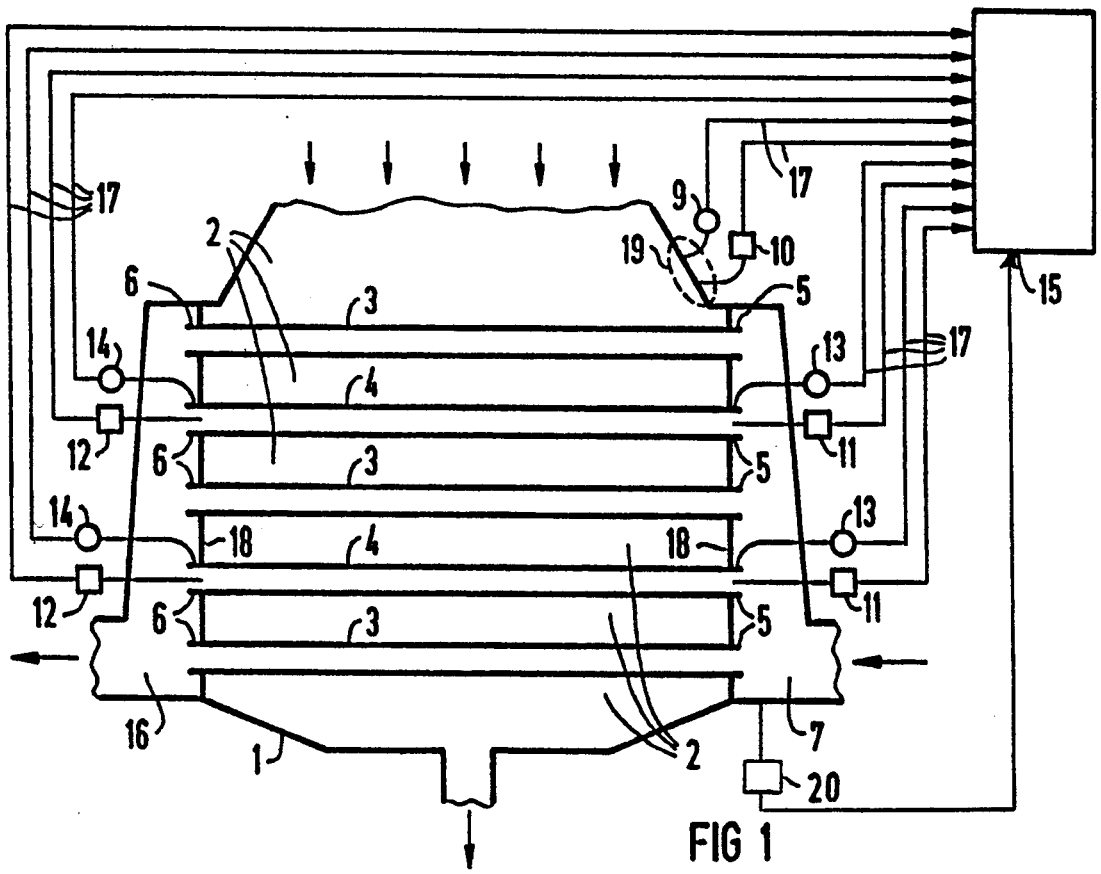

United States Patent [19]

Drosdziok et al.

[11] Patent Number: 5,385,202

[45] Date of Patent: Jan. 31, 1995

[54] METHOD AND APPARATUS FOR OPERATIONAL MONITORING OF A CONDENSER WITH TUBES, BY MEASUREMENTS AT SELECTED TUBES

[75] Inventors: Armin Drosdziok, Essen; Walter Zörner, Baiersdorf-Igelsdorf, both of Germany

[73] Assignee: Siemens Aktiengesellschaft, Munich, Germany

[21] Appl. No.: 58,296

[22] Filed: May 6, 1993

[30] Foreign Application Priority Data

Nov. 6, 1990 [DE] Germany ............... 4035242

[51] Int. Cl.$^6$ ............ F28B 11/00; G01K 17/12
[52] U.S. Cl. .................... 165/1; 165/95; 165/11.1
[58] Field of Search ............ 165/11.1, 95, 1

[56] References Cited

U.S. PATENT DOCUMENTS

| | | | |
|---|---|---|---|
| 3,312,274 | 4/1967 | Sebald | 165/11.1 |
| 4,390,058 | 6/1983 | Otake et al. | 165/95 |
| 4,476,917 | 10/1984 | Otake et al. | 165/95 |
| 4,488,516 | 12/1984 | Bueters et al. | 122/379 |
| 4,729,667 | 3/1988 | Blangetti et al. | 165/11.1 |
| 4,738,302 | 4/1988 | Abma | 165/39 |
| 4,766,553 | 8/1988 | Kaya et al. | 165/11.1 |

FOREIGN PATENT DOCUMENTS

| | | |
|---|---|---|
| 0030459 | 6/1981 | European Pat. Off. |
| 0155826 | 9/1985 | European Pat. Off. |
| 0342767 | 11/1989 | European Pat. Off. |
| 2939053 | 7/1980 | Germany |
| 3125546 | 3/1982 | Germany |
| 3705240 | 9/1988 | Germany |
| 0028940 | 2/1982 | Japan ............... 165/11.1 |
| 61-246590 | 11/1986 | Japan |
| WO92/08089 | 5/1992 | WIPO ............... 165/11.1 |

OTHER PUBLICATIONS

Power Engineering, 60/Sep. 1960, Wilson and Joost: "Methods of Checking Steam Condesor Performance" 4 pages.
Symposium on State-of-the Art Condensor Technology, Drsdziok, Engelke & Plotz: "Tube Bundle Design and Performance Experience in Large Units", pp. 1–13.
ASME/IEEE Power Generation Conference, Sep. 25–29, 1988, Zörner and Drosdziok and Zörner: "Functional and Thermodynamic Control of Steam Turbine Condensers and Their Peripheral Systems", pp. 1–12.
57-028940, Japanese Abstract, Feb. 16, 1982.
62-233683, Japanese Abstract Oct. 14, 1987.
57-169600, Japanese Abstract Oct. 19, 1982.
58-145895, Japanese Abstract Aug. 31, 1983.
58-208587, Japanese Abstract, Dec. 5, 1983.
"Warmeaustausch & Warmetauscher", Mohler et al, Verlag Sauerlander Aarau und Frankfurt/Main, pp. 840–857 (no translation) (1973).
"Diagnosesystem zur Betriebsuberwachung von Dampfturbinenanlagen", Andreae et al., pp. 1–33 (no translation) (1990).

*Primary Examiner*—John K. Ford
*Attorney, Agent, or Firm*—Herbert L. Lerner; Laurence A. Greenberg

[57] ABSTRACT

A method and an apparatus are provided for the operational monitoring of a condenser including a steam chamber through which steam to be condensed flows and at least one configuration having a plurality of tubes in the steam chamber through which a coolant fluid passes from an inlet to an outlet end. The steam pressure and/or temperature is measured at least at one measuring point in the steam chamber. In addition, the inlet temperature of the coolant fluid at the inlet end, the outlet temperature of the coolant fluid at the outlet end and the coolant fluid mass throughput are measured at each selected tube. The measurements are evaluated to determine the heat transfer coefficient of each selected tube and the coefficients thus determined are assessed for diagnostic purposes. In particular, a signal is given when at least one heat transfer coefficient differs substantially from a predetermined setting.

15 Claims, 1 Drawing Sheet

METHOD AND APPARATUS FOR OPERATIONAL MONITORING OF A CONDENSER WITH TUBES, BY MEASUREMENTS AT SELECTED TUBES

CROSS-REFERENCE TO RELATED APPLICATION:

This application is a continuation of International Application Ser. No. PCT/DE91/00833, filed Oct. 25, 1991.

SPECIFICATION:

The invention relates to a method and an apparatus for the functional or operational monitoring of a condenser, particularly a condenser incorporated into a steam turbine system, having at least one configuration of tubes, each of which has a coolant fluid flowing through it from an inlet end to an outlet end and is bathed by or has a flow around it of steam to be condensed.

Power plant systems development has always been oriented to the economic aspects of producing electricity. After a phase of increasing system size, which was especially pronounced in nuclear power plants because of their high investment costs, the high fuel costs of fossil-fueled power plants and the capital investment for environmental protection provisions led on one hand to the development of systems with high energy efficiency by using high fresh-steam states, and on the other hand to complex system configurations, sometimes with options for the coupling of heat for heating purposes or the like.

In view of those aspects, power plant operation must always strive to attain the current thermodynamic optimum, in order to produce electricity as economically as possible. Such aspects as maintenance and repair are also variables with considerable economic and commercial significance. Each time it becomes possible to further increase the work utilization of the systems, economic efficiency is improved. The use of diagnostic systems is suggested in order to increase the work utilization of a power plant system as much as possible. With it, a comprehensive overview of the current system state can be gained, as is needed if the system is to be controlled for the most advantageous mode of operation in economic and commercial terms. With suitable diagnosis, impending malfunctions can also be recognized early and averted, or at least abated by appropriate remedies. The invention relates to the diagnosis of a condenser, that is to the detection of comprehensive measurement values and information during condenser operation, for the sake of an overall evaluation of its operational state, early detection of operating conditions that lead to malfunctions, and initiation of suitable counter measures as applicable.

Published European Application No. 0 030 459 A1, corresponding to U.S. Pat. No. 4,390,058 and German Published, Non-Prosecuted Application DE 37 05 240 A1 have already shown ways of monitoring a condenser in a steam power plant system that are directed primarily to monitoring the tubes in the condenser, through which a coolant medium (which as a rule is water taken from a river or the like) flows and which is bathed by or has a flow around it of the steam to be condensed. As a rule, prior intensive cleaning of the water being used as a coolant medium is precluded for economic reasons. Therefore, there is usually contamination, which is usually muddy coatings, in the tubes. Such contamination is typically counteracted by adding cleaning bodies to the coolant water that mechanically clean the inner surfaces of the tubes. According to Published European Application No. 0 030 459 A1, corresponding to U.S. Pat. No. 4,390,058, such cleaning is called for whenever the heat balance of the condenser as ascertained by the diagnostic system, indicates worsening which is so extensive that certain fixed specifications are exceeded. In order to ascertain the heat balance, the heat flux passing through a plurality of tubes is measured at the tubes by means of heat flux sensors mounted on the outer surfaces of the tubes. In German Published, Non-Prosecuted Application DE 37 05 240 A1, it is suggested that measurements be made at tubes which are selected at random and distributed largely uniformly over the condenser, in order to determine the heat transfer coefficients of the tubes, to which end each of the selected tubes should be provided at its outlet end with a temperature sensor and a cap. If the selected tube has coolant water flowing through it during normal operation, then the temperature sensor measures the outlet temperature of the coolant water. If the selected tube is closed by the cap, then the coolant water located in it eventually assumes the temperature of the steam that bathes or flows around the outside of the tube, and once the cap is opened again, the temperature sensor measures the temperature of the steam located outside the tube, as the temperature of the coolant water emerging from the tube. After a certain period of time, which should be measured by the diagnostic unit, the temperature of the coolant water emerging from the tube drops back to the normal outlet temperature again. The period of time being measured is a measure of the flow velocity of the coolant water in the tube, so that together with the temperature of the coolant water upon entering the tube, which is determined by a further temperature sensor, all of the data are available that are needed to calculate the heat transfer coefficient (which is largely independent of operation). Tube cleaning is then called for whenever the heat transfer coefficient drops below a threshold value that can be specified. In order to bring about the tube cleaning, the heat transfer coefficients of all of the selected tubes should be determined, and tube cleaning should already be performed when even a single heat transfer coefficient drops below the specified threshold value.

Discussions regarding functional monitoring of a condenser are found in the report entitled "Tube Bundle Design and Performance Experience in Large Units" by A. Drosdziok, W. Engelke and J. Plotz, in the EPRI Symposium on Condenser Technology, Jun. 7-9, 1983, Orlando, Fla., and the report entitled "Functional and Thermodynamic Control of Steam Turbine Condensers and Their Peripheral Systems" by W. Zörner and A. Drosdziok, in the ASME Paper 88-JPGC/Pwr-23. Both reports point to a source of functional disturbances of the condenser that is equally as significant as tube soiling, namely the entry of inert gases, especially air, into the steam system. Under some circumstances, inert gases can make it more difficult for steam to contact the tubes, therefore lowering condenser output.

Published Japanese Application No. 61 246 590 pertains to an embodiment of the apparatus shown in German Published, Non-Prosecuted Application 37 05 240 A1, for monitoring a condenser in which the measurement of the steam temperature for each selected tube having a heat transfer coefficient which is to be determined is carried out at different tubes in the immediate vicinity of the selected tube, which are closed by plugs and in which temperature measuring instruments are located. Each selected tube is assigned a flow rate meter for determining the mass throughput of the coolant flowing through it. The determination of the heat transfer coefficient for each selected tube is carried out by evaluating the measurement values obtained at that selected tube or for that selected tube.

U.S. Pat. No. 4,488,516 relates to an apparatus for removing ash deposits and the like from the walls of a combustion chamber, which in particular may be part of a steam boiler. The apparatus includes a multiplicity of blowers, each of which can remove deposits from part of the wall of the combustion chamber, by blasting air, water or steam. An associated temperature measuring instrument or heat flow instrument is installed in the vicinity of each blower and by means of it the degree of soiling of the wall in the region around the blower is determined. If the degree of soiling reaches a certain limit, then the blower is activated.

It is accordingly an object of the invention to provide a method and an apparatus for operational monitoring of a condenser with tubes, which overcome the hereinafore-mentioned disadvantages of the heretofore-known methods and devices of this general type, which disclose a possibility for monitoring a condenser that takes into account both data which integrally describe the condenser function and are necessary in their entirety for diagnosis of the power plant system, and data that describe "details", for instance in describing individual tubes or small groups of tubes in the condenser. In this way, contrary to the prior art, an effective "total diagnosis" of the condenser with a view to all of the impairments that might occur is intended to be attained. The intent is to dispense with complicated additional devices for making the condenser work, and the monitoring should be carried out with the simplest and accordingly especially sturdy means, which if at all possible should be accessible and amenable to being installed and dismantled even in the course of miscellaneous inspections of the condenser.

With the foregoing and other objects in view there is provided, in accordance with the invention, a method for operational monitoring of a condenser including a steam chamber through which steam to be condensed flows, at least one configuration in the steam chamber having a multiplicity of tubes, each of the tubes conducting a flow of a coolant fluid through it from an inlet end to an outlet end, and the multiplicity of tubes having a plurality of selected tubes, which comprises measuring an inlet temperature of the coolant fluid at the inlet end, an outlet temperature of the coolant fluid at the outlet end, a temperature of the steam immediately flowing around the selected tube, and a mass throughput of the coolant fluid flowing through the selected tube, for each of the selected tubes; determining a heat transfer coefficient from a product of the mass throughput and a logarithm of a quotient of differences between an ambient temperature and the inlet temperature as well as between the ambient temperature and the outlet temperature, for each of the selected tubes; subsequently comparing the heat transfer coefficients of all of the selected tubes with a set-point value, and issuing a warning if at least one of the heat transfer coefficients deviates substantially from the set-point value; measuring the steam pressure and/or the steam temperature of the steam at least at one measurement point in the steam chamber; and calculating the temperature of the steam immediately flowing around each of the selected tubes from one of the steam pressure and the steam temperature as well as a previously ascertained form of a distribution of the pressure and/or the temperature in the steam chamber.

In order to carry out the method, a condenser to be monitored need merely equipped with the simplest possible means for pressure and temperature measurements. Complicated and expensive mechanical components are dispensed with and, except for a steam pressure or steam temperature measuring instrument, measuring instruments in the steam chamber can be dispensed with. This is particularly valuable, since measuring instruments disposed between the tubes in the steam chamber may be accessible only with difficulty after the condenser has been installed and thus can hardly be inspected and replaced if necessary. The invention largely permits a limitation to measuring instruments that can be mounted at the inlet and outlet ends of the tubes, which as a rule discharge into readily accessible inflow and outflow chambers. The single measuring instrument that is necessary in the steam chamber may be mounted at a largely freely selectable measuring location, in particular at a measuring location that is easily accessible and/or is distinguished by advantageous physical conditions. The invention makes it possible to achieve an especially simple and especially sturdy diagnosis system in combination with an equally simple diagnosis method, which is especially appropriate for the structural provisions that are generally applicable to power plant systems and are directed to optimal work utilization and maximum operating safety. It will be understood that in the content of the invention the diagnosis may also be extended to auxiliary equipment of the condenser, such as the vacuum system, by the provision of suitable sensors.

The invention is based on the recognition that pressure and temperature in the steam chamber of the condenser are fixed on one hand by the geometry of the condenser and on the other hand by the relationship between pressure and temperature, which is unequivocal because of the special thermodynamic state of the steam in the condenser, that is saturated steam. The distribution of pressure and temperature in the steam chamber can already be determined unequivocally by a pressure or temperature measurement at a single measuring point in the steam chamber, once the form of distribution of the pressure or temperature has been ascertained a single time theoretically or experimentally in a special case. In order to ascertain that distribution, the flow of the condensing steam through the configuration of tubes may be calculated, while optionally taking experimentally obtained information into account. The non-homogeneity of the distribution can be ascribed primarily to the influence of pressure losses that the steam flow incurs at the tubes. This is explained in the aforementioned report, "Tube Bundle Design . . . " by Drosdziok, Engelke and Plotz, for example. The fluctuations of pressure and temperature in the steam chamber in typical condensers are located in a band that is approximately 20% in width, at most. With a single pressure or temperature measurement in the steam chamber, preferably at a measuring point remote from the tube configuration, the differential pressure and the ambient temperature, namely the temperature of the steam directly bathing or flowing around the selected tube, can thus be ascertained for each tube selected.

The invention also makes advantageous use of the known simple and safe options for determining the mass throughput of the coolant fluid flowing through a selected tube. Determining the mass throughput can be carried out especially simply by means of pressure measurements at the inlet and outlet ends of the selected tubes, since the mass throughput is substantially proportional to the pressure difference between the inlet end and the outlet end. Inductive flow rate meters may also be used under some circumstances, because in the condenser of a power plant system, substantially unprepared and thus electrically conductive water from a suitably abundant natural resource is typically used as the coolant fluid.

Determining the heat transfer coefficient of a selected tube requires a logarithm of the quotient of two temperature differences to be formed. This is no problem and can be carried out either with known analog logarithmizers or after digitation of the measurement values for the temperatures or of the quotient on a digital computer. In principle it is unnecessary to prepare measured values and values derived from them in such a way that they are in the form of numerical values for typical units. It is generally adequate to carry out the arithmetic preparation which is necessary in the context of the diagnosis method with variables that are proportional to the temperatures and pressures, etc.. Nevertheless, in accordance with another mode of the invention, to avoid possible complications, it is advantageous to use the natural logarithm as it is obtained from the given physical conditions of the method, as the logarithm.

In accordance with a further mode of the invention, in order to analyze the measurement data obtained in the monitoring, it is also advantageous to determine the heat input into the coolant fluid flowing through the selected tube for each tube selected, because this variable is especially well-suited to representing the thermodynamic conditions in the interior of the condenser. In addition, the "mean logarithmic temperature difference", the quotient of the difference between the outlet temperature and the inlet temperature and the aforementioned logarithm, may be ascertained as an advantageous measure for the heat transfer. The heat transfer coefficient is obtained in this case as a number that is proportional to the quotient of the heat output and the mean logarithmic temperature difference.

In accordance with an added mode of the invention, in a condenser that has an inflow chamber into which all of the tubes open at their inlet ends, a single measuring point in the inflow chamber is provided for determining the inlet temperatures of all of the selected tubes. This is entirely adequate for the purposes of the method, because usually there are no split heat sources for local heating of the coolant water upstream of the tubes extending in the steam chamber, and it can thus generally be assumed that all of the tubes are being acted upon by coolant water at the same temperature.

With the objects of the invention in view, there is also provided in a condenser including a steam chamber through which steam to be condensed flows, at least one configuration in the steam chamber having a multiplicity of tubes, each of the tubes having inlet and outlet ends for conducting a flow of a coolant fluid through the tubes from the inlet ends to the outlet ends, and the multiplicity of tubes having a plurality of selected tubes, an apparatus for operational monitoring of the condenser, comprising means disposed at least at one measuring point in the steam chamber for measuring steam pressure and/or steam temperature, in particular a steam pressure sensor or a steam temperature sensor; inlet temperature sensors each being disposed at the inlet end of a respective one of the selected tubes, outlet temperature sensors each being disposed at the outlet end of a respective one of the selected tubes, and means disposed at each respective selected tube for measuring mass throughput, in particular an inductive flow rate meter, or a combination of an inlet pressure sensor at the inlet end and an outlet pressure sensor at the outlet end; and a diagnosis device being connected to the means for measuring steam temperature and/or steam pressure, to the inlet temperature sensors, to the outlet temperature sensors, and to the means for measuring the mass throughput, for determining a temperature of the steam immediately flowing around each selected tube from one of the steam temperature and the steam pressure for that selected tube.

In accordance with another feature of the invention, the selected tubes are distributed substantially uniformly over the configuration having a multiplicity of tubes.

In accordance with a concomitant feature of the invention, the measuring point for determining the steam temperature and/or steam pressure is disposed remote from the configuration having the tubes, preferably above this configuration. This makes the measuring point easily reachable, and above all it enables a particularly reliable statement to be made about the steam flow at such a measuring point. Finally, at a measuring point located above the tubes there is virtually no possibility of impairment of the measurement value pickups from deposits or the like.

Other features which are considered as characteristic for the invention are set forth in the appended claims.

Although the invention is illustrated and described herein as embodied in a method and an apparatus for operational monitoring of a condenser with tubes, by measurements at selected tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Figure 2:
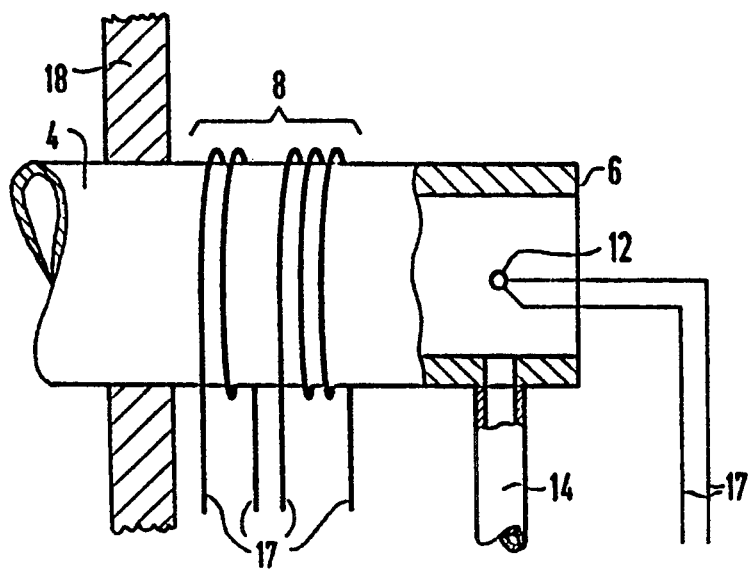

FIG. 1 is a fragmentary, highly simplified and diagrammatic cross-sectional and schematic view of a condenser equipped for functional or operational monitoring; and FIG. 2 is a fragmentary, partly broken-away, cross-sectional view of an example of a way in which tubes of the condenser are equipped with sensors.

Referring now to the figures of the drawing in detail and first, particularly, to FIG. 1 thereof, there is seen a condenser 1, in the interior of which a steam chamber 2 is provided for receiving a flow of steam from the top to be condensed. The steam bathes or flows around a configuration of tubes 3, 4, which extend through the steam chamber 2 and through which a coolant fluid, in particular coolant water, flows. The steam condenses on the tubes 3, 4, and the resultant liquid condensate collects in a lower region of the condenser 1, from which it is drained off. The disposition of the tubes 3, 4 includes a number of selected tubes 4, which are equipped with sensors 11, 12, 13, 14 for the purposes of the invention. The tubes 3, 4 are let or recessed into tube bottoms 18. At the same time, these tube bottoms 18 divide an inflow chamber 7 to which the coolant fluid is delivered, and an outflow chamber 16 from which the coolant fluid is drained off again, from the steam chamber 2. The tubes 3, 4 have inlet ends 5 which protrude into the inflow chamber 7 and outlet ends 6 which protrude into the outflow chamber 16. The coolant fluid flows out of the inflow chamber 7 into the inlet ends 5, through the tubes 3, 4, and finally emerges from the outlet ends 6 into the outflow chamber 16, from which it is pumped away by means that are universally known and are therefore not shown herein. Optionally, cleaning bodies with which the inner surfaces of the tubes 3, 4 are cleaned, may be added to the coolant fluid upstream of or in the inflow chamber 7. These cleaning bodies should be removed from the coolant fluid again in or downstream of the outflow chamber 16.

The steam chamber 2 is provided with a steam pressure sensor 9 and a steam temperature sensor 10 at a measuring point 19 above the tubes 3, 4. As a rule, only one of these sensors 9, 10 is necessary, because as a result of the special thermodynamic state of the steam in the condenser 1, an unequivocal relationship exists between the steam pressure and the steam temperature. The inlet ends 5 of the selected tubes 4 are also equipped with inlet temperature sensors 11 and inlet pressure sensors 13. In the same way, the outlet ends 6 of the selected tubes 4 have outlet temperature sensors 12 and outlet pressure sensors 14. The temperature sensors 11, 12 serve in combination with the steam temperature sensor 10 to determine the quantities of heat that are removed from the steam in the steam chamber 2 by the coolant fluid flowing through the selected tubes 4, and thus for determining the heat output of each selected tube 4. The pressure sensors 13, 14 serve to determine the mass throughput of coolant fluid through the selected tubes 4 and they may optionally be replaced by other sensors. A detailed description of the structure of the pressure sensors 9, 13 and 14 and the temperature sensors 10, 11 and 12 is unnecessary, because a great many such sensors are well-known and in wide use. All of the sensors 9, 10, 11, 12, 13 and 14 have connecting lines 17 leading to a diagnosis device 15. Typically, this diagnosis device 15 is an electronic unit made by digital or analog technology, or a combination of digital and analog components. Since a wide variety of corresponding components are known, including and in particular from the prior art cited above, further description regarding the structure and function of the diagnosis device 15 may be dispensed with.

FIG. 2 shows possible ways of providing a selected tube 4 with sensors. The outlet end 6 of the selected tube 4 protrudes from the tube bottom 18, in which the selected tube 4 is secured. The outlet temperature sensor 12 in the form of a thermocouple is disposed in the vicinity of the outlet end 6. The outlet pressure sensor 14 is also provided, although only a length of tube thereof leading to a manometer or the like can be seen in the drawing. The selected tube 4 is also shown in the vicinity of the outlet end 6 as having an inductive flow rate meter 8, in the form of two coils that are wound side by side around the selected tube 4. The inductive flow rate meter 8 and the outlet temperature sensor 12 have the connecting lines 17 that are to be connected to corresponding electronic operating equipment, which is known per se.

The present invention enables functional or operational monitoring of a condenser having tubes by way of measurements taken at selected tubes. It is merely necessary for the measurements to use arbitrarily available, simple sensors that can easily be inspected and replaced in miscellaneous inspections. The functional or operational monitoring according to the invention readily fits into a diagnostic system for a complete power plant system and makes it possible to monitor all of the parameters that are necessary for characterizing the operating state of the monitored condenser.

We claim:

1. A method for operational monitoring of a condenser including a steam chamber through which steam to be condensed flows, at least one configuration in the steam chamber having a multiplicity of tubes, each of the tubes conducting a flow of a coolant fluid through it from an inlet end to an outlet end, and the multiplicity of tubes having a plurality of selected tubes, which comprises:

a) obtaining an inlet temperature of the coolant fluid at the inlet end, an outlet temperature of the coolant fluid at the outlet end, an ambient temperature defined as a temperature of the steam immediately flowing around the selected tube, and a mass throughput of the coolant fluid flowing through the selected tube, for each of the selected tubes;

b) measuring at least one of the steam pressure and the steam temperature of the steam at least at one measurement point in the steam chamber;

c) calculating the temperature of the steam immediately flowing around each of the selected tubes from one of the steam pressure and the steam temperature as well as a previously ascertained form of a distribution of at least one of the pressure and the temperature in the steam chamber;

d) determining a heat transfer coefficient from a product of the mass throughput and a logarithm of a quotient of differences between the ambient temperature and the inlet temperature as well as between the ambient temperature and the outlet temperature, for each of the selected tubes; and e) subsequently comparing the heat transfer coefficients of all of the selected tubes with a set-point value, and issuing a warning if at least one of the heat transfer coefficients deviates substantially from the set-point value.

2. The method according to claim 1, which comprises using a natural logarithm as the logarithm.

3. The method according to claim 2, which comprises:

a) determining a heat input into the coolant fluid flowing through the selected tubes from a product of the mass throughput and a difference between the outlet temperature and the inlet temperature, for each of the selected tubes;

b) determining a logarithmic temperature difference as a quotient of the difference between the outlet temperature and the inlet temperature and the logarithm, for each of the selected tubes; and c) calculating the heat transfer coefficient from a quotient of the heat output and a mean logarithmic temperature difference.

4. The method according to claim 1, which comprises feeding the coolant flow from an inlet chamber into all of the inlet ends, and determining the inlet temperatures for all of the selected tubes in common at a measurement point in the inlet chamber.

5. The method according to claim 1, which comprises:
   a) measuring an inlet pressure of the coolant fluid at the inlet end and measuring an outlet pressure of the coolant fluid at the outlet end, for each of the selected tubes; and
   b) determining the mass throughput for each of the selected tubes from the difference between the inlet pressure and the outlet pressure.

6. The method of one of claims 1, which comprises:
   a) conducting an electrically conductive liquid through the tubes as the coolant fluid; and
   b) determining the mass throughput for each of the selected tubes with an inductive flow rate meter.

7. The method of one of claims 1, which comprises:
   a) conducting water in which traces of minerals are dissolved through the tubes as the coolant fluid; and
   b) determining the mass throughput for each of the selected tubes with an inductive flow rate meter.

8. In a condenser including:
   a steam chamber through which steam to be condensed flows, at least one configuration in the steam chamber having a multiplicity of tubes, each of the tubes having inlet and outlet ends for conducting a flow of a coolant fluid through the tubes from the inlet ends to the outlet ends, and the multiplicity of tubes having a plurality of selected tubes,
   an apparatus for operational monitoring of the condenser, comprising:
   a) means disposed at least at one measuring point in the steam chamber for measuring at least one of steam pressure and steam temperature;
   b) inlet temperature sensors each being disposed at the inlet end of a respective one of the selected tubes, outlet temperature sensors each being disposed at the outlet end of a respective one of the selected tubes, and means disposed at each respective selected tube for measuring mass throughput; and
   c) a diagnosis device being connected to said means for measuring at least one of steam temperature and steam pressure, to said inlet temperature sensors, to said outlet temperature sensors, and to said means for measuring the mass throughput, for determining an ambient temperature defined as a temperature of the steam immediately flowing around each selected tube from one of the steam temperature and the steam pressure, as well as a previously ascertained form of a distribution of at least one of the pressure and the temperature in the steam chamber; and for calculating a heat transfer coefficient from a product of the mass throughput and a logarithm of a quotient of differences between the ambient temperature and the inlet temperature as well as between the ambient temperature and the outlet temperature, for each of the selected tubes; and for comparing the heat transfer coefficients of all of the selected tubes with a set-point value, and issuing a warning if at least one of the heat transfer coefficients deviates substantially from the set-point value.

9. The apparatus according to claim 8, wherein said means for measuring at least one of steam pressure and steam temperature is a steam pressure sensor.

10. The apparatus according to claim 8, wherein said means for measuring at least one of steam pressure and steam temperature is a steam temperature sensor.

11. The apparatus according to claim 8, wherein said means for measuring the mass throughput is an inductive flow rate meter.

12. The apparatus according to claim 8, wherein said means for measuring the mass throughput is a combination of an inlet pressure sensor at the inlet end and an outlet pressure sensor at the outlet end.

13. The apparatus according to claim 8, wherein the selected tubes are distributed substantially uniformly over the configuration having the multiplicity of tubes.

14. The apparatus according to claim 8, wherein the at least one measuring point is remote from the configuration having the tubes.

15. The apparatus according to claim 8, wherein the at least one measuring point is above the configuration having the tubes.

* * * * *